(12) United States Patent
Richter et al.

(10) Patent No.: US 10,728,702 B2
(45) Date of Patent: Jul. 28, 2020

(54) NETWORKED DATA MANAGEMENT USING PEDESTRIAN TRAFFIC PATTERNS

(71) Applicant: Changing Environments, Inc., Cambridge, MA (US)

(72) Inventors: Sandra Yvonne Richter, Cambridge, MA (US); Jutta Friedrichs, Somerville, MA (US); Katy Gero, Cambridge, MA (US); Kenneth D Sebesta, Boston, MA (US)

(73) Assignee: Changing Environments, Inc., Cambridge, MA (US)

( * ) Notice: Subject to any disclaimer, the term of this patent is extended or adjusted under 35 U.S.C. 154(b) by 0 days.

(21) Appl. No.: 15/875,722

(22) Filed: Jan. 19, 2018

(65) Prior Publication Data

US 2018/0213357 A1 Jul. 26, 2018

Related U.S. Application Data

(60) Provisional application No. 62/448,988, filed on Jan. 21, 2017.

(51) Int. Cl.
*H04W 4/02* (2018.01)
*H04M 1/725* (2006.01)
(Continued)

(52) U.S. Cl.
CPC ...... *H04W 4/023* (2013.01); *G06F 16/24578* (2019.01); *H04M 1/72572* (2013.01);
(Continued)

(58) Field of Classification Search
CPC . H04W 4/023; H04W 4/027; H04W 52/0254; G06F 16/24578; H04M 1/72572;
(Continued)

(56) References Cited

U.S. PATENT DOCUMENTS 6,674,403 B2  1/2004 Gray et al.
6,742,032 B1  5/2004 Castellani et al.
(Continued)

FOREIGN PATENT DOCUMENTS

CN  203278896 U  11/2013
EP    2182752 A1   6/2014
(Continued)

*Primary Examiner* — Marcos L Torres
(74) *Attorney, Agent, or Firm* — Adams Intellex, PLC

(57) ABSTRACT

Techniques are disclosed for networked data management using pedestrian traffic patterns. Data is collected from a plurality of mobile devices by one or more immobile devices. A traffic pattern is determined for a subset of the plurality of mobile devices. Interest level management and cluster analysis can be performed using the traffic pattern. Pausing by a mobile device, within the subset of the plurality of mobile devices, can be sensed. Direction of a gaze by an individual associated with the mobile device can be evaluated. A plurality of content messages is ranked, and one message is selected from the plurality of content messages as the content for pushing to the display. The content that is pushed can be defined using environmental information. Content is pushed to a display associated with the one or more immobile devices.

35 Claims, 10 Drawing Sheets

(51) Int. Cl.
   *G06F 16/2457* (2019.01)
   *H04W 52/02* (2009.01)
(52) U.S. Cl.
   CPC ........ *H04W 4/027* (2013.01); *H04W 52/0254* (2013.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/26* (2018.01)
(58) Field of Classification Search
   CPC .. Y02D 70/162; Y02D 70/166; Y02D 70/142; Y02D 70/26; Y02D 70/144; Y02D 70/164
   See application file for complete search history.

(56) References Cited

U.S. PATENT DOCUMENTS

| | | | |
|---|---|---|---|
| 7,450,954 B2 | 11/2008 | Randall | |
| 8,090,532 B2 | 1/2012 | Tashev et al. | |
| 8,138,930 B1 | 3/2012 | Heath | |
| 8,233,918 B2 | 7/2012 | Roin et al. | |
| 8,583,142 B2 | 11/2013 | Das et al. | |
| 8,612,542 B2 | 12/2013 | Frazier et al. | |
| 8,615,565 B2 | 12/2013 | Randall | |
| 8,880,649 B2 | 11/2014 | Randall | |
| 8,886,759 B2 | 11/2014 | Randall et al. | |
| 9,179,185 B2 | 11/2015 | Fry et al. | |
| 9,215,608 B2 | 12/2015 | Berenberg et al. | |
| 9,247,002 B1 | 1/2016 | Randall | |
| 9,247,481 B2 | 1/2016 | Joo | |
| 9,294,431 B2 | 3/2016 | Frazier et al. | |
| 9,338,123 B2 | 5/2016 | Frazier et al. | |
| 9,344,773 B2 | 5/2016 | Hayton et al. | |
| 2010/0306190 A1 | 12/2010 | Turner et al. | |
| 2012/0315839 A1* | 12/2012 | Mumcuoglu | H04W 4/02 455/2.01 |
| 2013/0018714 A1* | 1/2013 | George | G06Q 30/0261 705/14.16 |
| 2013/0244624 A1 | 9/2013 | Das et al. | |
| 2014/0172557 A1 | 1/2014 | Eden et al. | |
| 2014/0074984 A1 | 3/2014 | Frazier et al. | |
| 2014/0108544 A1* | 4/2014 | Lewis | H04W 4/026 709/204 |
| 2014/0142885 A1 | 5/2014 | Chowdhary et al. | |
| 2015/0068720 A1 | 3/2015 | Lipoma et al. | |
| 2015/0105608 A1 | 4/2015 | Lipoma et al. | |
| 2015/0127758 A1 | 5/2015 | Frazier et al. | |
| 2015/0358594 A1* | 12/2015 | Marshall | G06F 3/013 345/419 |
| 2016/0050559 A1 | 2/2016 | Rose et al. | |
| 2016/0225102 A1 | 8/2016 | DeNino et al. | |
| 2016/0241652 A1 | 8/2016 | Frazier et al. | |

FOREIGN PATENT DOCUMENTS

| | | |
|---|---|---|
| WO | WO2006010774 A1 | 2/2006 |
| WO | WO2012036654 A1 | 3/2012 |
| WO | WO2015153214 A1 | 10/2015 |
| WO | WO2015184440 A3 | 3/2016 |

\* cited by examiner

NETWORKED DATA MANAGEMENT USING PEDESTRIAN TRAFFIC PATTERNS

RELATED APPLICATIONS

This application claims the benefit of U.S. provisional patent application "Networked Data Management Using Pedestrian Traffic Patterns" Ser. No. 62/448,988, filed Jan. 21, 2017. The foregoing application is hereby incorporated by reference in its entirety.

FIELD OF ART

This application relates generally to data management and more particularly to networked data management using pedestrian traffic patterns.

BACKGROUND

The twenty-first century has been described as the century of "global urbanization". Many people want to live in cities for a variety of reasons. Whether for employment, culture, convenience, excitement, or amusements, among many other reasons, people are finding that cities can provide many lifestyle choices and advantages. People often cite the benefits of living in cities. One frequently referenced reason for city dwelling is the presence of historic buildings. People love to look at the old buildings and often feel that it is the presence of the old buildings, rather than the shiny, tall, new, skyscrapers, that give their city its architectural character. Food is another often mentioned reason for city dwelling. People love to try different types of food for the taste sensations and the opportunity to learn more about other cultures. Restaurants in the cities offer cuisines that are authentic to many continents, countries, and regions of the world, or derive from them. One can easily find a French pastry for breakfast, Pad Thai for lunch, and chicken Katsu curry for dinner, possibly even within a short walk from one's apartment. People also love cities for the public parks. Commons, parks, and greenspaces, preferably located by or with a view of water, are the most popular. Lakes, rivers, and the ocean, all sate the desire to be near water. City dwellers also tend to list available transportation as a benefit of city living. Whether they use surface transportation, subways, ride share services, or Citi™ Bikes, city dwellers do not have to own a car or, if they so choose, even learn to drive.

A further benefit of city dwelling is the ubiquitous nature of information that is available. The Information Age has created an environment in which information is everywhere. From theater district plays, stock quotes, and locations of the night's best raves to text messages from one's mother, the information available surrounds us. Information can be created, stored, distributed, and consumed. People access and consume the information for a variety of personal and social purposes, a primary one reflecting the desire to feel connected. They want to have a sense of community and a sense of belonging. The information can enable those feelings and bonds. People interface with the information to view it, search for it, add to it, delete it, and question it, among other interactions. The information can convey data and knowledge. Data includes values assigned to various parameters such as a temperature equaling 75 degrees Fahrenheit and the sky being clear. Knowledge includes awareness of the data such as for the given temperature and sky conditions, the weather is lovely and comfortable. Information, when accurate, can reduce uncertainty. Each person who consumes information can decide the relevance, importance, value, and trustworthiness of the information, and can act accordingly.

SUMMARY

Networked data is managed, where the management is based on network traffic. Pedestrians, and travelers using low-speed vehicles such as bicycles, e-bicycles, chairs, Segways™, scooters, carts, etc., can move through shared, public spaces. The public spaces can include a variety of space types such as parks, playgrounds, squares, plazas, green spaces, markets, and so on. The networked data can include information that is intended to encourage community engagement. The community engagement includes attracting pedestrians and others to the community spaces and providing the pedestrians and others information from which they can benefit. As these entities move through a public space, data can be collected from their mobile devices. The collected data can be anonymous data such as media access control (MAC) address, service set identifier (SSID), power level, time, etc. The collected data can be used to construct a "profile" relating to the mobile device being used by an individual. The profile can be keyed to a unique identifier such as the MAC address of the mobile device. The profile can infer schedules, preferences, habits, and demographics of individual. The data collected from the various mobile devices of the pedestrians and others can be analyzed to determine a traffic pattern. The traffic pattern can show both high concentrations and low concentrations of pedestrians and others, direction of travel, pausing, and so on. Based on the traffic pattern, content can be pushed to one or more immobile devices, displays, etc. The content that is pushed is displayed where the pedestrians and others can view the content. The content can inform, engage, encourage, entertain, and so on.

Techniques for data management are disclosed comprising: collecting data from a plurality of mobile devices by one or more immobile devices; determining a traffic pattern for a subset of the plurality of mobile devices; and pushing content to a display associated with the one or more immobile devices. The traffic pattern can be determined using two or more of the immobile devices. Data that is collected can be routed to a server. In some embodiments, the traffic pattern comprises a foot traffic pattern. The foot traffic can include individuals who are walking, strolling, running, jogging, etc. In other embodiments, the traffic pattern comprises a soft mobility traffic pattern. A soft mobility traffic pattern can include non-motorized vehicles such as bicycles, scooters, rollerblades, wheelchairs, and the like. The traffic pattern can comprise mechanized low-speed vehicles such as e-bicycles, e-scooters, e-wheelchairs, Segways™, etc. Each of the plurality of mobile devices is associated with an individual. The association can be anonymous such as being associated by a MAC address, or it can be based on an identification such as a user profile. The content that is pushed can be in response to a request by one or more immobile devices, by the display, or by a network hub. A network hub can include a hub, a switch, a router, a wireless router, and the like.

The content that is pushed can include a series of messages, where the series of messages can include repeated content or can provide a narrative. The method can further include ranking a plurality of content messages and selecting one message from the plurality of content messages to push to the display. The ranking can be based on factors, parameters, weights, objective functions, and so on. The ranking can be based on a number of mobile devices present; a direction of motion for a majority of the mobile devices; a temperature in an area surrounding the display; a battery level charge for powering the display; a battery voltage, a solar cell current, a currency amount associated with the one message; a screen temperature for the display; an amount of ambient light surrounding the display; a weather condition in an area around the display; an amount of white data, grayscale data, or black and white data, or a time of day.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Information is managed and distributed in public spaces. The information can support community engagement and participation in public spaces, urban environments, and so on. Networked data management uses traffic patterns to choose information that can be displayed. The information can be displayed to pedestrians or others as they move through the public spaces. The traffic patterns can be based on foot traffic or soft mobility traffic. Soft mobility traffic can include non-motorized, low speed vehicles, such as bicycles, roller blades, scooters, wheelchairs, etc. Soft mobility traffic can also include buses and certain other types of mass transit. The low-speed vehicles can also include e-bicycles, mopeds, Segways™, and the like. Low-speed traffic is of particular interest because individuals remain in a given area long enough to engage with each other and to consume information that can be presented to them. The public spaces can include parks, playgrounds, green spaces, squares, plazas, markets, and other outdoor spaces that provide meeting and interaction spaces. The information which is presented, when it is timely, relevant, and engaging, can help provide to the individuals a sense of place and belonging and can engage them in the community.

Disclosed techniques support data management. Data is collected from a plurality of mobile devices by one or more immobile devices. The one or more immobile devices can include hubs, routers, switches, wireless access points, wireless clients, and so on. A traffic pattern is determined for a subset of the plurality of mobile devices. The traffic pattern, such as a foot traffic pattern or a soft mobility traffic pattern, can be based on data such as media access control (MAC) address, service set identification (SSID), power levels, weather conditions, etc. Content is pushed to a display associated with the one or more immobile devices. The display can be adjacent to the one or more mobile devices so that the content can be viewed by the individuals. The display can include a screen such as an LED, LCD, OLED, plasma or other display, a projection such as a 2-D, 3-D or holographic projection, etc. The content that is pushed can include messages, a series of messages, repeated messages, messages that provide a narrative, and the like.

Figure 1:
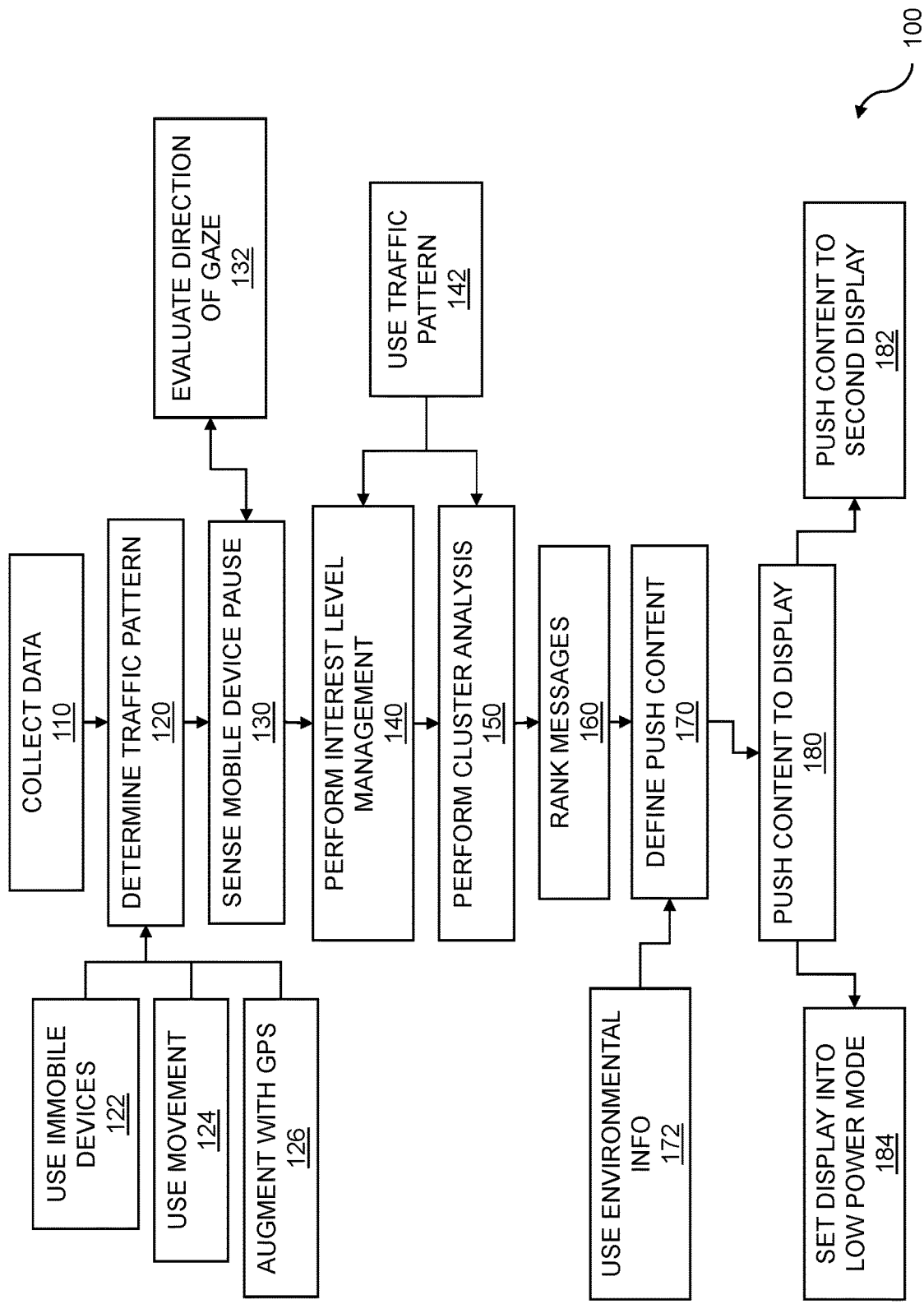
FIG. 1 is a flow diagram for data management.

FIG. 1 is a flow diagram for data management. Networked data management uses traffic patterns, where the traffic patterns can include pedestrian traffic patterns, foot traffic patterns, soft mobility traffic patterns, etc. Data is collected from a plurality of mobile devices by one or more immobile devices. Each mobile device is associated with an individual. The mobile devices can include smart phones, personal digital assistants, smart watches, wearable devices, tablets, etc. The immobile devices can be located within an outdoor environment such as a park, playground, square, plaza, market, green space, along a street, at transit stops, in front of businesses, and so on. A traffic pattern is determined for a subset of the plurality of mobile devices. Content is pushed to a display associated with one or more immobile devices. In embodiments, the display is immobile, such as an LCD, LED, OLED, or e-paper display mounted on a wall or a pole in the public space. In other embodiments, the display is a projection, where the projection can be a projection on a screen or on a wall, a 3-D projection, a holographic projection, and so on. The flow 100 includes collecting data 110 from a plurality of mobile devices by one or more immobile devices. The immobile devices can include networked devices, where the networked devices can include sensors, wireless access points, network sniffers, and so on. In embodiments, the data which is collected by the one or more immobile devices is routed through a network hub. As discussed elsewhere, pushing content can be in response to requesting content by the network hub or other component. The network hub can be a hub, a switch, a router, a wireless router, etc. The data which is collected is routed to a server. The server can be an on-site server or an off-site server, a cloud server, a mesh server, a distributed server, a third-party server, and so on. In embodiments, the data collected from the plurality of mobile devices includes profile information for users associated with a second subset of the plurality of mobile devices. The profile information can include a media access control (MAC) address, a service set identifier (SSID), a previous SSID, a location, a power level, a time, a date, and so on. The profile information can be collected over either a short or long period of time. The profile information can be collected for any period of time from shorter than a few minutes seconds, to a few minutes, an hour, several hours, a day, a week, etc. The short period of time can give a sense of instantaneous information, where this instantaneous information can determine current location, gaze direction, time, weather, ambient light, event, etc. A longer period of time can develop profile information more fully to learn trends, preferences, demographics, and so on. In embodiments, the subset of mobile devices and the second subset of mobile devices overlap one another. In other embodiments, the subset of mobile devices and the second subset of mobile devices are substantially identical.

The flow 100 includes determining a traffic pattern 120 for a subset of the plurality of mobile devices. The traffic pattern can be based on pedestrians, foot traffic, soft mobility traffic, operators of low-speed vehicles, and so on. The soft mobility vehicles can include bicycles, scooters, rollerblades, wheelchairs, and the like. The low-speed vehicles can include e-bicycles, powered wheelchairs, e-scooters, Segways™, and so on. In embodiments, traffic delineation can be performed to determine a number of individuals in the traffic and to identify whether the traffic includes a pedestrian, a bicyclist, an individual on rollerblades, a bus at a bus stop, and the like. The number of people present on a bus at a bus stop can be evaluated based on the number of mobile devices that become present in one short time interval. The traffic pattern can be determined using two or more of the immobile devices. The traffic pattern can be determined based on detection of a mobile device by one immobile device, detection of the mobile device by a second immobile device, loss of detection of the mobile device by the first immobile device, and so on. The traffic pattern can include information on movement of the two or more mobile devices from the plurality of mobile devices. Movement can also be detected based on changes in signal strength of signals emitted by the one or more mobile devices and detected by the one or more immobile devices.

In embodiments, the determining of the traffic pattern is based on timestamped proximity information using two or more immobile devices 122. In other embodiments, the determining of the traffic pattern is based on triangulation information using the two or more of the immobile devices 122. In yet other embodiments, the foot traffic pattern includes detecting movement 124 and augmenting data collected from the plurality of mobile devices with location positioning information such as global positioning system (GPS) information 126. The GPS information can be obtained from the mobile device, from the immobile device, from a third party, and so on. In embodiments, the traffic pattern includes information on dwell time for a mobile device within the subset of the plurality of mobile devices. The dwell time can include pausing, stopping, turning around, etc. The dwell time can include seconds, minutes, etc. Embodiments can include evaluating return of a mobile device within the subset of the plurality of mobile devices to an area within view of the display. A mobile device can be carried out of a public space into an enclosed space such as a restaurant, then can be carried back to the public space. The return of the mobile device within the subset of the plurality of devices can occur within a specific time interval, where the time interval can include minutes, hours, days, weeks, etc. The determining the traffic pattern can include evaluation of a cumulative moving average. The cumulative moving average can be based on a duration of time, on a location, etc. In embodiments, the cumulative moving average is for a specific time interval.

The flow 100 includes sensing a pause 130 by a mobile device within the subset of the plurality of mobile devices. The sensing a pause can be inferred based on movement of the device through the public space. Based on sensing a pause, direction of gaze 132 by an individual associated with the mobile device can be evaluated. The direction of gaze can be into the public space, out of the public space, toward a mobile device, toward a display, away from a display, and so on. The flow 100 includes performing interest level management 140 using the traffic pattern 142. Interest level management can include gauging interest in particular content based on time of day, day of week, day of month, time of year, and so on. Interest level management can be based on a profile that can be collected based on a MAC address, SSID, previous SSID, etc. Interest level management can determine or infer actions, such as based on an early morning hour, the individual associated with a mobile device may be interested in obtaining a caffeinated beverage and would appreciate content revealing how to obtain that beverage. The flow 100 includes performing cluster analysis 150 using the traffic pattern 142. The cluster analysis can be used for machine learning, statistical analysis, and so on. The cluster analysis can be used to determine a number of clusters, a number of mobile devices within a cluster of mobile devices, the locations of the clusters within the public space, and the like.

The flow 100 includes ranking messages 160. The ranking of messages can be based on a numeric score, a percentage, preferences of a user of a mobile device, a flag, an advertising campaign, a public relations campaign, and so on. The ranking can include ranking a plurality of content messages and selecting one message from the plurality of content messages to push to a display. The ranking of the content messages can be based on other parameters, factors, objective functions, etc. In embodiments, the ranking is based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light surrounding the display, a weather condition in an area around the display, an amount of white data, an amount of grayscale data, an amount of black and white data, or a time of day. The flow 100 includes defining the content that is pushed 170. In embodiments, the defining the content to be pushed includes using environmental information 172. The environmental information can include weather, event, or lighting conditions. The environmental information can include time of day (e.g. day or night), time of year, rainy or fair conditions, hot or cold temperatures, etc. The defining of content that can be pushed can be based on using context information. The context information can include the profile that can be assembled based on gathered data such as MAC address, SSID, time of day, day of week, location, travel patterns, and so on. The context can be based on third party information. The defining of content that can be pushed can be based on requesting content, where the content can be requested by the network hub, the immobile device, the display, the individual, and so on.

The flow 100 includes pushing content 180 to a display associated with the one or more immobile devices. The display can be an immobile display such as an LCD, LED, OLED, or other type of display mounted on a wall, a pole, a mast, a bracket, or otherwise affixed in the public space. The display can be a projection. The projection can include a projection on a screen or on a wall, a two-dimensional (2-D) projection, a three-dimensional (3-D) projection, a holographic projection, and so on. In embodiments, the pushing content can be in response to requesting content by one of the one or more immobile devices. The one or more immobile devices can monitor or detect a presence of a mobile device for traffic pattern determination, and can evaluate a direction of gaze (or probable direction of gaze) by an individual toward a screen. In other embodiments, the pushing content can be in response to requesting content by the display. The display can request content as a result of waking from a low-power mode, evaluating direction of gaze toward a display after an elapsed time period, and so on. The content which can pushed to the display can be routed through a network hub. The network hub can be a hub, a switch, a router, a wireless router, and so on.

Various types of content can be pushed to the display associated with the one or more immobile devices. The pushing content can include pushing content to a second display 182 associated with the one or more immobile devices. In embodiments, the content includes a series of messages. The messages can include public announcements, public service announcements (PSAs), advertisements, news, sports results, sales, products, events, etc. The series of messages can include repeated content. The repeated content can include news bulletins, weather reports, PSAs, and other messages that can be repeated after a time interval, at specific times, in different languages, and so on. The series of messages can provide a narrative. The narrative can describe an advertising campaign, promote community events, etc. Embodiments include setting the display into a low power mode 184 based on the traffic pattern. When there is no traffic and no individuals are gazing at a display the one or more displays can be placed into low power mode. The low power mode can include a dimmed display, a sleep state for the display, and so on. The low power mode, which can be enabled from time to time, as needed, etc., can enable power efficiency of the one or more displays. In embodiments, the one or more displays are powered using solar cells. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
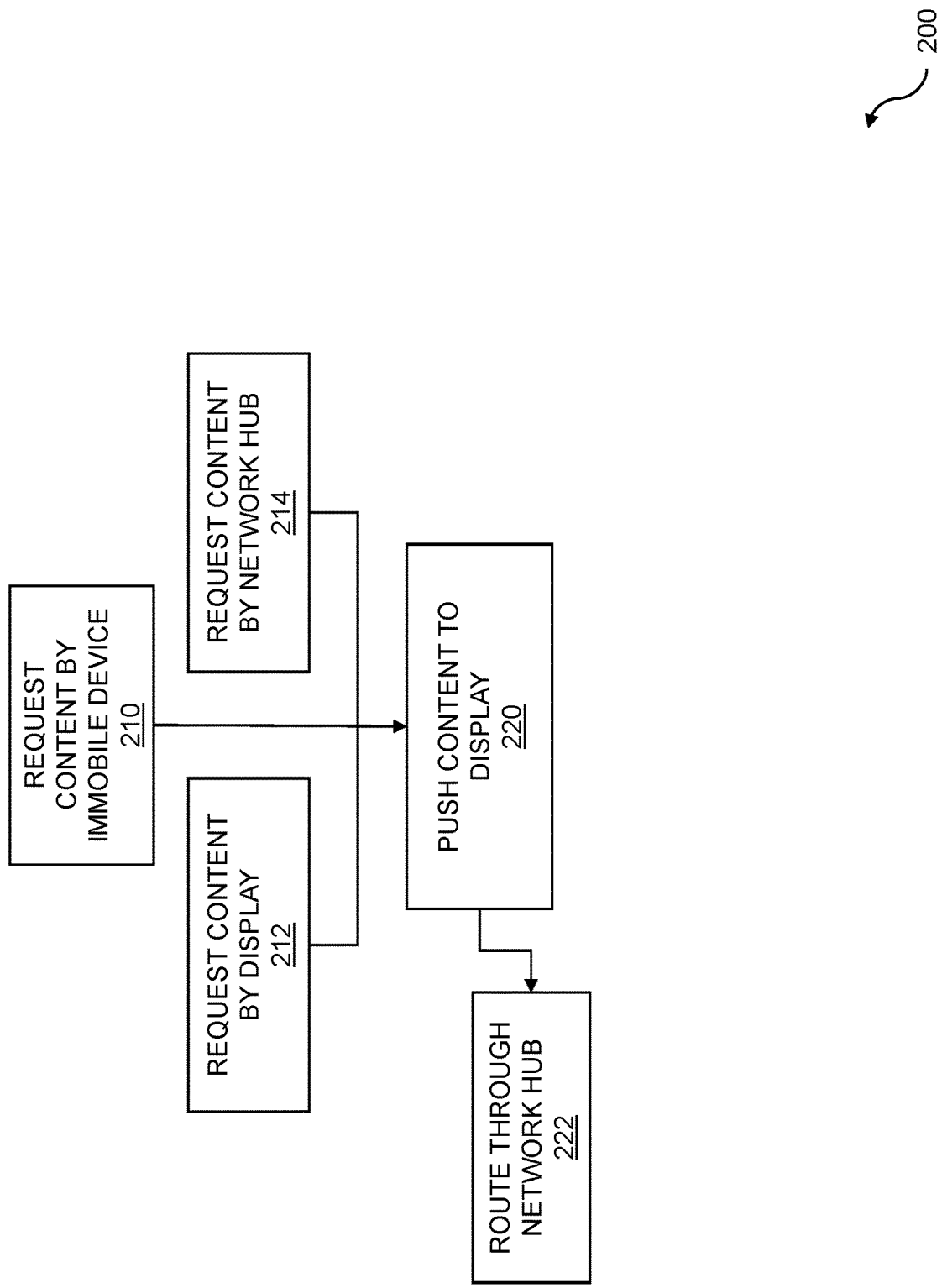
FIG. 2 is a flow diagram for requesting content.

FIG. 2 is a flow diagram for requesting content. Content, which can include one or more messages, can be pushed to one or more displays. The content can include advertisements, public service announcements (PSA), sports scores, tourist information, community information, transportation timetables, and so on. The management of the content can support networked data management using traffic patterns. The traffic patterns can include foot traffic or pedestrian traffic patterns, soft mobility traffic patterns, and so on. The content to be pushed can be requested by one or more components, where the components can include software components, software blocks, etc. The components that initiate the requests can be components for networked data management. The pushing content can be in response to the requesting content by the components. The flow 200 includes requesting content by one of the one or more immobile devices 210. An immobile device can include a network hub, where the network hub can include a hub, a switch, a router, a wireless router, etc. The immobile device can detect signals, including wireless signals, where the wireless signals can include Wi-Fi™ Bluetooth™, near-field communication (NFC), and the like. The wireless signals can originate from mobile devices such as smartphones, PDAs, wearable computers, smart watches, smart glasses, etc. When an immobile device detects a mobile device, the immobile device can send a request for content. The pushing content can be in response to that request.

The flow 200 includes requesting content by the display 212. The display can request content for a variety of purposes which can include refreshing content on the display, requesting content after a low power or high temperature exception, requesting new content after a period of time, requesting content based on changing weather conditions, requesting content based on time of day, and so on. The flow 200 includes requesting content by the network hub 214. As stated above, the network hub can include a hub, a switch, a router, a wireless router, etc. The network hub can request content based on a request for content from a display, an immobile device, a mobile device, and the like. The flow 200 includes pushing content to a display 220. The display can be associated with the one or more immobile devices. The content can include text, messages, images, GIFs, animations, etc. The content which is pushed to the display can be routed through a network hub 222. The content can be provided by a content source such as a server, a library, a collection of advertisements, and so on. The content can be routed via a network from the content source to the display. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
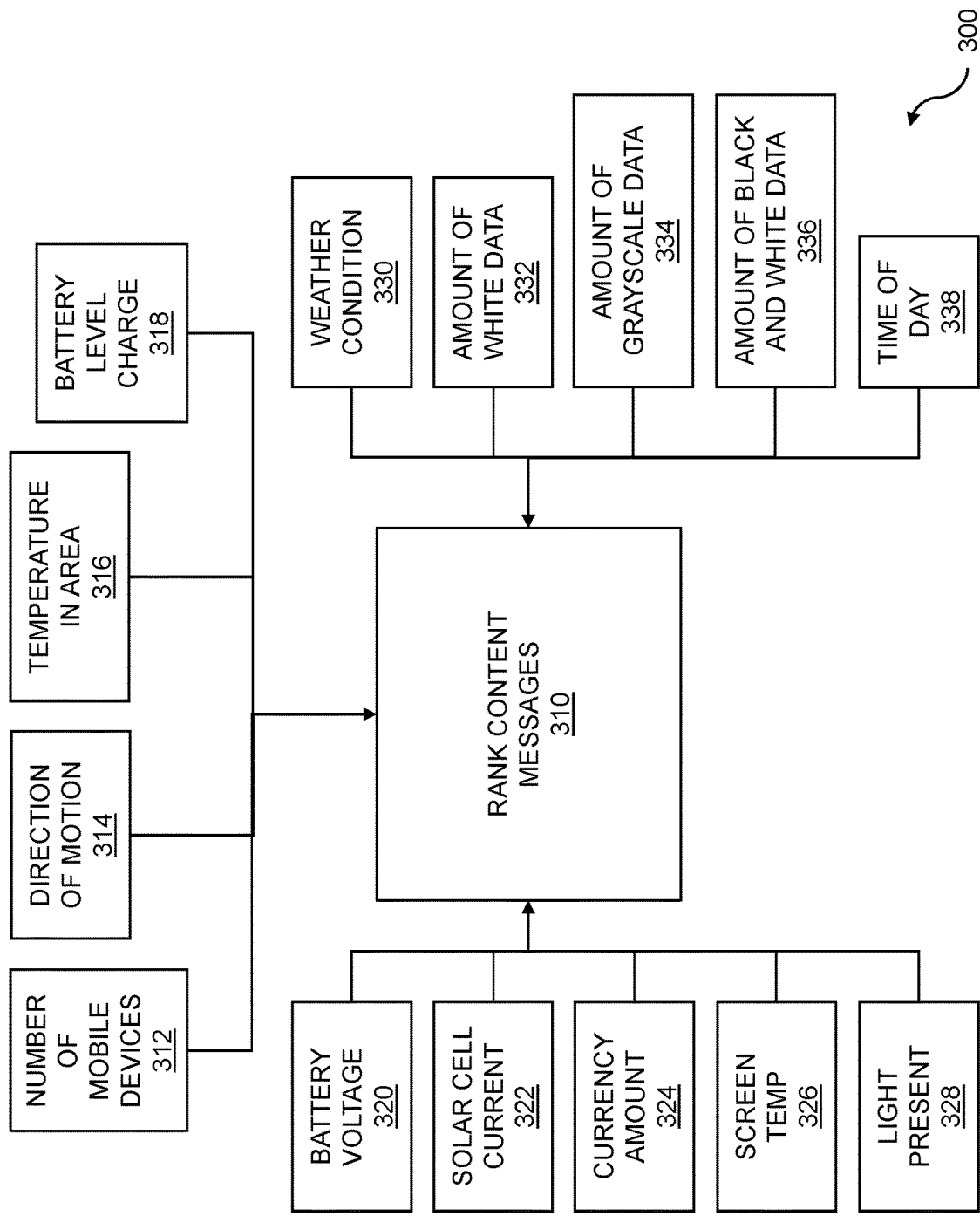
FIG. 3 is a flow diagram for ranking content messages.

FIG. 3 is a flow diagram for ranking content messages. Content including messages can be pushed to a display. Networked data management uses traffic patterns, such as pedestrian or foot traffic patterns, soft mobility traffic, and the like. The messages can include advertising, tourist or travel information, welcome messages, transportation information, etc. A plurality of messages can be available for display. The available messages can be prioritized, where the prioritizing includes ranking a plurality of content messages and selecting one message from the plurality of content messages as the content for the pushing to the display. Various criteria, parameters, objective functions, etc., can be applied to the prioritizing, ranking, and so on. The flow 300 includes ranking the content messages 310. The content messages can be ranked based on a numerical score, a value, a percentage, a flag, and the like. The ranking can be based on a number of mobile devices present 312. The mobile devices can include smartphones, PDAs, tablets, wearable computers, smart watches, smart glasses, and so on. The message can include an advertising message and can be pushed when many mobile devices are nearby.

The ranking can be based on direction of motion 314 for a majority of the mobile devices. A majority of mobile devices moving in the direction of one or more restaurants can raise the ranking of advertisements for food and beverages, a majority of mobile devices moving toward a multimodal transportation hub can raise the ranking of transportation timetables, etc. The ranking can be based on a temperature in an area 316 surrounding the display. A cold temperature can raise the ranking of an advertisement for travel to a warm climate, while a hot temperature can raise the ranking of an advertisement for a nearby restaurant selling gelato. The ranking can be based on a battery level charge 318 for powering the display. The battery level charge can be determined and the display can be powered up to display a message if sufficient battery level charge is available. The ranking can be based on a battery voltage 320. A battery voltage can be determined. When sufficient battery voltage is available, the display can be safely powered up and used to render the message. The ranking can be based on a solar cell current 322. An amount of solar cell current can be used to recharge batteries, to power the display, to keep the display powered on for a period of time, and so on.

The ranking can be based on a currency amount 324 associated with the one message. The currency amount can be related to an advertisement, travel information, a PSA, and so on. An advertisement that can yield a higher currency amount can receive a higher ranking than another advertisement with a lower currency amount or a PSA which must be pushed for free. The ranking can be based on a screen temperature 326 for the display. If the screen temperature is determined to exceed a threshold for safe screen operation, then the high screen temperature can inhibit or reduce pushing of messages to the display. The ranking can be based on an amount of ambient light present 328 surrounding the display. An amount of light present during daytime hours can rank some messages higher based on the message layout, color scheme, background, etc., while an amount of light present during nighttime can rank other message layouts higher. The ranking can be based on a weather condition 330 in an area around the display. A weather condition including precipitation can increase the ranking for advertisements directed to foul weather gear, while a weather condition that is fair can increase the ranking for messages suggesting outdoor pursuits. The messages can be ranked based on layout and content of the messages. The ranking can be based on an amount of white data 332 present in the message. A message with an amount of white data in the message background can be ranked higher for visibility during certain times of day. The amount of white data can influence other factors such as battery charge, screen temperature, etc. The ranking can include an amount of grayscale data 334. The amount of grayscale data can influence message legibility and can change message rankings based on an amount of light present. The ranking can include an amount of black and white data 336. The amount of black and white data can influence message rankings based on message legibility, display power requirements, and the like. The ranking can be based on a time of day 338. The time of day can influence the types of advertising messages, transportation schedules, recommended tourist attractions, etc. that may be shown. Various steps in the flow 300 may be changed in order, repeated, omitted, or the like without departing from the disclosed concepts. Various embodiments of the flow 300 can be included in a computer program product embodied in a non-transitory computer readable medium that includes code executable by one or more processors.

Figure 4:
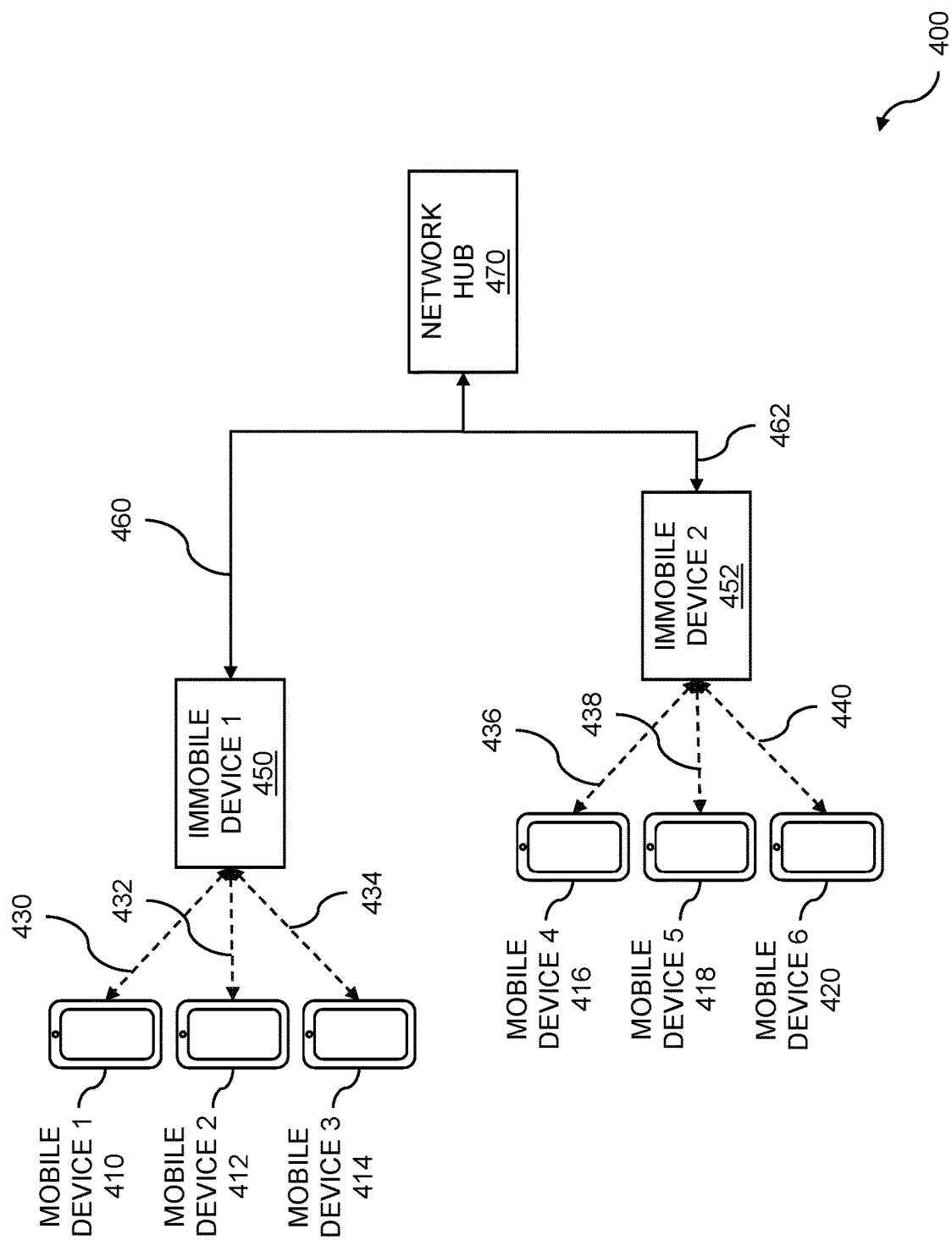
FIG. 4 illustrates network infrastructure.

FIG. 4 illustrates network infrastructure. Traffic patterns, such as foot traffic patterns, soft mobility patterns, and the like, are used for networked data management. Data from a plurality of mobile devices is collected by one or more immobile devices. A traffic pattern is determined for a subset of the plurality of mobile devices. Content is pushed to a display associated with the one or more immobile devices. A network infrastructure 400 can include a network hub such as network hub 470, immobile devices such as immobile device 1 450 and immobile device 2 452, and mobile devices such as mobile device 1 410, device 2 412, device 3 414, device 4 416, device 5 418, and mobile device 6 420. The network hub 470 can perform a variety of operations including transferring information, collecting information, and so on. The network hub can include a hub, a switch, a router, a wireless router, and so on. The network hub can be in communication 460 with immobile device 1 450 and in communication 462 with immobile device 2 452. The communication links or channels 460 and 462 can be wired links, wireless links, hybrid links, and so on. The network hub 470 can route the data which can be collected by the one or more immobile devices. In embodiments, the data which can be collected can be routed to a server. A server can include an onsite server, a remote server, a cloud server, a distributed server, etc. The server can store data, process data, choose messages to be pushed, and the like. The network hub can push content. The pushing content can be in response to requesting content by the network hub. The content can be pushed to a display (not shown). The content which can be pushed to the display can be routed through a network hub.

The mobile devices can be in communication with the immobile devices. The mobile devices can include one or more of smartphones, PDAs, wearable computers, smart watches, smart glasses, and so on. Mobile device 1 410 can communicate 430 with immobile device 1 450; mobile device 2 412 can communicate 432 with immobile device 1 450; and mobile device 3 414 can communicate 434 with immobile device 1 450. Mobile device 4 416 can communicate 436 with immobile device 2 452; mobile device 5 418 can communicate 438 with immobile device 2 452; and mobile device 6 420 can communicate 440 with immobile device 2 452. The communication channels or links 430, 432, 434, 436, 438, and 440 can be wireless links and can include Wi-Fi, Bluetooth, near field communication (NFC), Zigbee™, and so on. In embodiments, a given mobile device can be in communication with two or more immobile devices. Communication between a mobile device and two or more immobile devices can be based on location of the immobile devices, proximity of the mobile device to the immobile devices, and so on.

Figure 5:
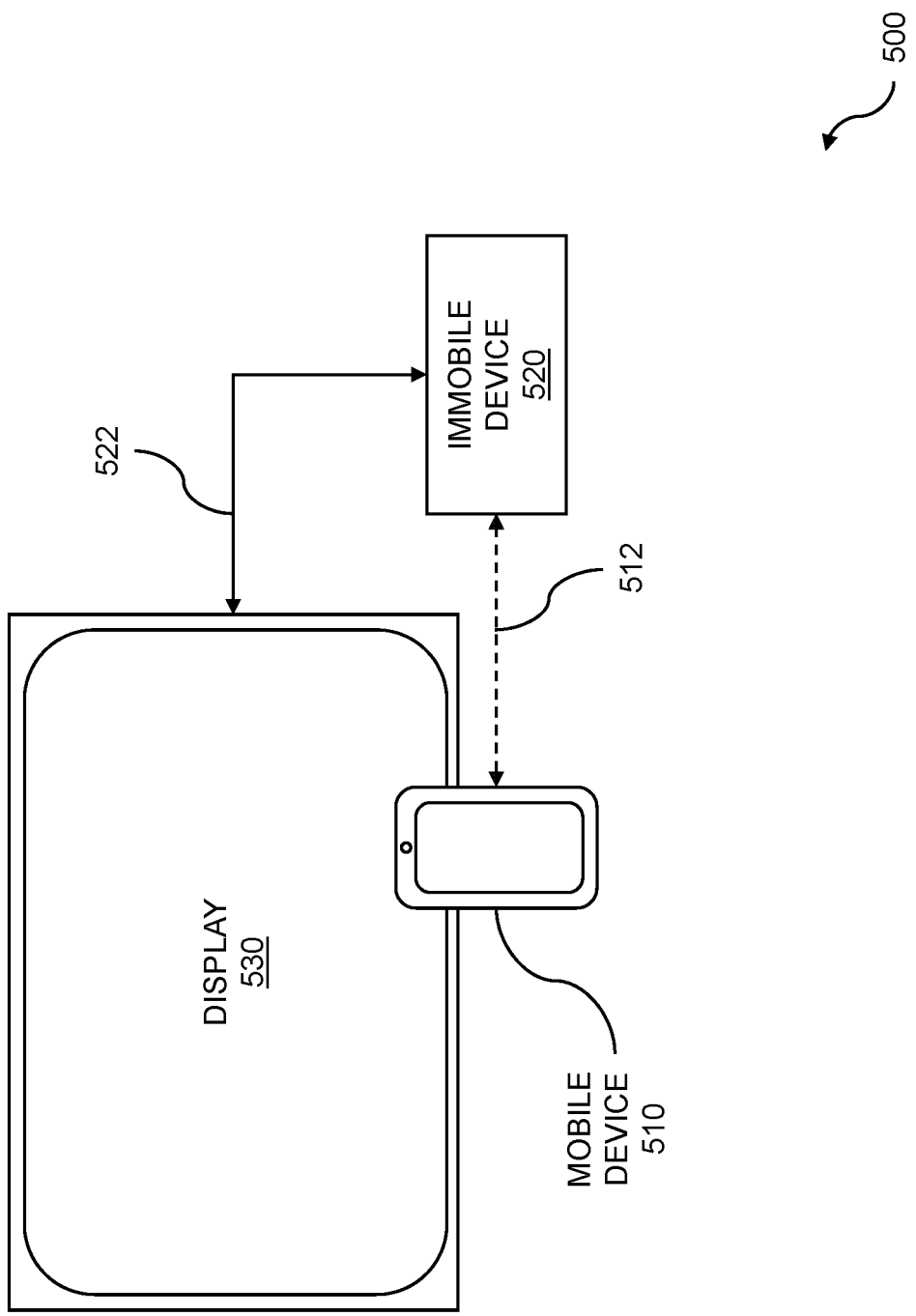
FIG. 5 shows an eye level view of display.

FIG. 5 shows an eye-level view of a display. Networked data management uses traffic patterns in spaces such as parks, squares, playgrounds, plazas, common spaces, green spaces, and so on. The traffic patterns can include a foot traffic pattern, a soft mobility traffic pattern, and so on. Data such as anonymous network data is collected from a plurality of mobile devices by one or more immobile devices. A mobile device can include a smartphone, a PDA, a tablet, a wearable computer, a smart watch, smart glasses, and the like. A traffic pattern is determined for a subset of the plurality of mobile devices. Content is pushed to a display associated with the one or more immobile devices. The display can include an immobile display, where the display can be a stand-alone display, a wall-mounted display, a display suspended from an overhead support, a display incorporated into a floor, and so on. The display can include a projection, where a projection can be a 2-D projection, a 3-D projection, a holographic projection, and so on. An example eye-level view of a display is shown 500. An individual with her or his mobile device 510 can move through a public space as discussed above. Data can be collected 512 from the mobile device 510 by an immobile device 520. The immobile device can include a network hub, where the network hub can include a hub, a switch, a router, a wireless router, etc. The immobile device can be in communication 522 with a display 530. The communication between the immobile device and the display can include a wired connection, a wireless connection, or a hybrid wired and wireless connection. When the individual pauses, the immobile device 520 can detect that the user has paused and can evaluate a direction of gaze of the individual who is associated with the mobile device. When the gaze of the individual is in the direction of the display 530, then content can be pushed to the display 530.

The content that can be pushed to the display 530 can include messages. The message can include travel information, PSAs, advertisements, tourist information such as directions or information relating to local attractions or restaurants, and so on. The content can include one or more messages. When more than one message may be included in the content to be pushed to the display, the messages can be ranked. Embodiments further include ranking a plurality of content messages and selecting one message from the plurality of content messages to push to the display. The messages can be ranked based on presets, parameters, weights, public relations campaigns, advertising campaigns, and the like. In embodiments, the ranking of the messages can be based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light surrounding the display, a weather condition in an area around the display, an amount of white data, an amount of grayscale data, an amount of black and white data, or a time of day.

Figure 6:
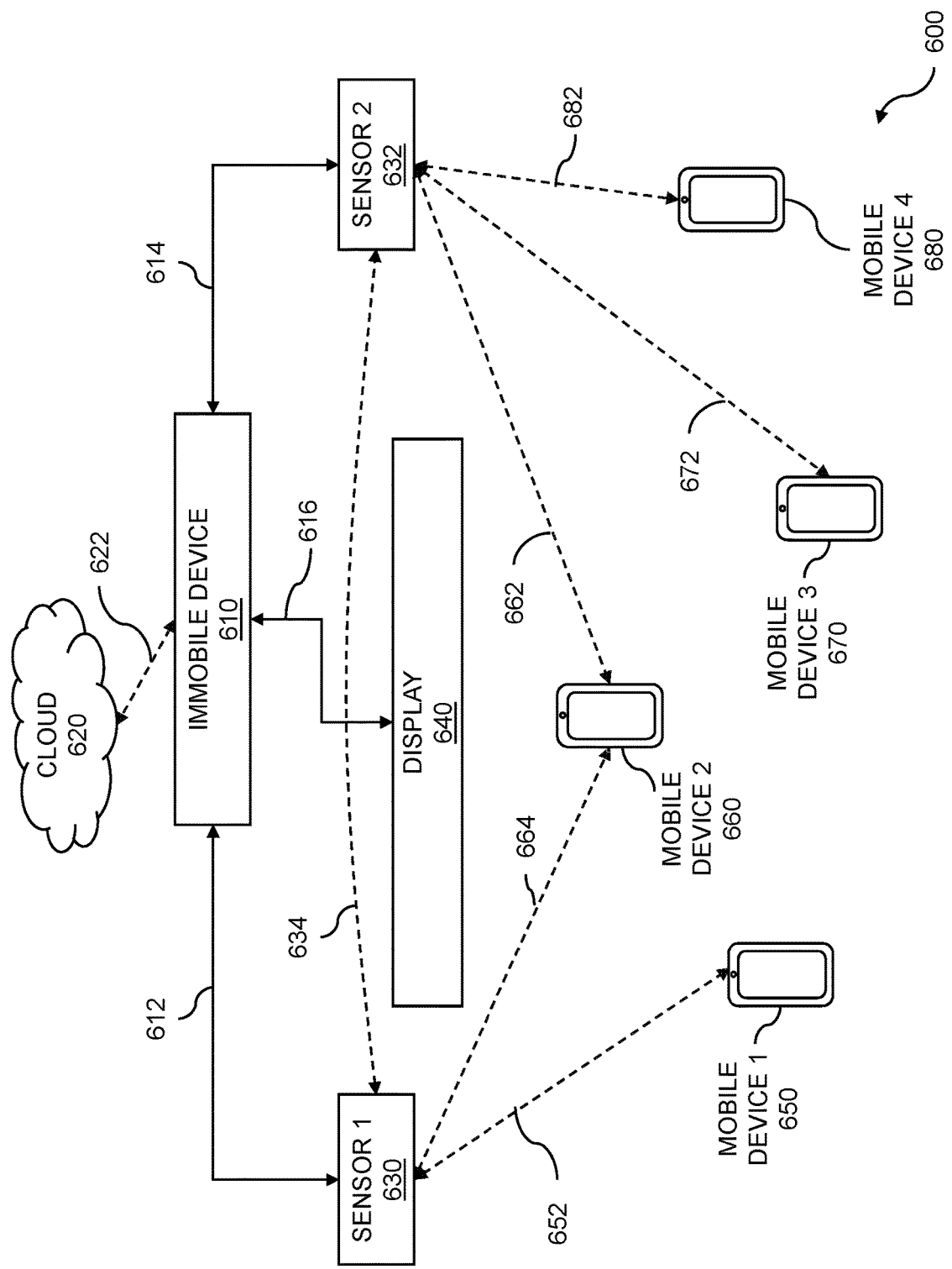
FIG. 6 illustrates display and mobile device interaction.

FIG. 6 illustrates display and mobile device interaction. Data management, including networked data management, uses traffic patterns. The traffic patterns can include pedestrian traffic patterns. The data management includes collecting data from a plurality of mobile devices by one or more immobile devices. The mobile devices can include smartphones, PDAs, tablets, wearable computers, and so on. A traffic pattern is determined for a subset of the plurality of mobile devices. The traffic pattern can include a foot traffic pattern. The traffic pattern can include a soft mobility traffic pattern, where a soft mobility traffic pattern can include non-motorized transport such as bicycles, scooters, rollerblades, wheelchairs, and the like. Each of the plurality of mobile devices can be associated with an individual. A direction of gaze by an individual can be associated with the mobile device. The direction of gaze can be toward a display, away from a display, etc. Content is pushed to a display associated with the one or more immobile devices. The content can include welcome messages, travel information, PSAs, advertisements, sports scores, and the like.

Display and mobile device interaction is illustrated 600. An immobile device 610 can be coupled to a cloud 620. The cloud can include a network cloud, where the coupling to the network cloud can include wireless communication techniques, wired techniques, hybrid wired and wireless techniques, and so on. The cloud can provide services, where the services can support storage, analysis services, identification, content, advertising, information, etc. The immobile device can communicate 622 with the cloud using wired, wireless, or hybrid communications techniques. In embodiments, content occasionally can be downloaded from the cloud. The downloads can occur at times, such as nighttime, when data volumes on the network are likely to be lower. The immobile device 610 can be coupled to one or more sensors such as sensor 1 630 and sensor 2 632. While two sensors are shown, other numbers of sensors can be coupled to the immobile device using wired, wireless, or hybrid communications techniques. The immobile device can include a network component such as a hub, a switch, a router, a wireless router, a managed network device, and so on. The sensors, sensor 1 630 and sensor 2 632, can detect wireless signals such as Wi-Fi, Bluetooth™, near field communication (NFC), and so on. The sensors can include wireless access points that can capture Wi-Fi data, where the Wi-Fi data can include service set identification (SSID), channel number, encryption protocol, signal strength, and the like. The one or more sensors can be coupled to the immobile device. In the example shown, sensor 1 can be coupled 612 to the immobile device, sensor 2 can be coupled 614 to the immobile device, and so on. The couplings 612 and 614 can include wireless communications, wired communications, etc. In embodiments, the sensors can support communication between and among a portion of or all of the other sensors, such as communications path 634. The immobile device 610 can be in communication with a display such as display 640. The display 640 can be an immobile display such as an LED, LCD, OLED, plasma, or other display; mounted on a wall; a stand-alone structure; suspended from above; incorporated into a floor; and so on. The display can include a projection such as an image on a screen, a 2-D projection, a 3-D projection, a hologram, etc. The immobile device can be in communication with display 640 via link 616. Link 616 can be a wired link, a wireless link, a hybrid link, and so on. In embodiments, the immobile device 610, sensor 1 630, sensor 2 632, and display 640 can be included in one unit, while in other embodiments, some or all of the components 610, 630, 632, and 640 can be included in separate units Mobile devices are shown in communication with sensors. A mobile device can include a smartphone, a personal digital assistant, a tablet, a wearable computer, a smart watch, smart glasses, and so on. Mobile device 1 650 is in communication 652 with sensor 1 630; mobile device 2 660 is in communication 664 with sensor 1 630 and in communication 662 with sensor 2 632; mobile device 3 670 is in communication 672 with sensor 2 632; and mobile device 4 680 is in communication 682 with sensor 2 632. Other quantities and different types of mobile devices can be present. A direction of travel of a mobile device can be determined by various techniques. One technique can include detecting an increasing power level of a given device. The increasing power level can indicate that the device is in close proximity to a sensor. Similarly, a decreasing power level can indicate that a device is moving farther away from a sensor. A mobile device can be detected by a first sensor, by multiple sensors, by a second sensor, and so on. Such detection can indicate that a device is within range of one sensor, moving to within range of multiple sensors, moving out of range of one sensor and moving into range of a second sensor, and so on. For example, mobile device 2 660 can be detected 664 by sensor 1 630 and can be detected 662 by sensor 2 632 as mobile device 2 660 moves out of range of sensor 1 630 and into range of sensor 2 632. Gaze direction can also be detected to determine whether the individuals associated with the mobile devices 650, 660, 670, and 680, are gazing at the display 640. If some or all of the individuals are gazing at display 640, then content can be pushed through the immobile device 610 to the display 640. The immobile device 610 can otherwise adjust the display 640 such as increasing brightness during the day, decreasing the brightness at night, setting the display into low-power mode based on traffic pattern or when no content is being displayed, etc. In embodiments the display can be powered using solar cells.

Various types of content can be rendered on the display 640. The content can include text, graphics, images, graphics interchange format (GIF) images and animations, etc. The content can include travel information, tourist information, recommendations for local attractions, PSAs, advertisements, sporting event scores, and so on. The advertisements and other content can be sold in a programmatic fashion based on traffic patterns. The content can include one or more messages which can be generally relevant to individuals passing through a space such as a park, plaza, mall, green space, etc. The messages can be related to travel information when the display is located near a multimodal travel hub such as a bus stop or station, train station, airport, etc. The messages can include "buzzing", where buzzing can include an individual activating a specific message on a display. The content that can be rendered on the display can include real-time content. The real-time content can include breaking news stories, current sports scores, messages about the imminent arrival or a train or bus, and so on. In embodiments, optical feedback can be used to confirm that the content rendered on the display is the current, intended content, rather than unintended or stale information. The messages that are pushed to the display can be ranked, where the ranking can include ranking a plurality of content messages and selecting one message from the plurality of content messages as the content for the pushing to the display. Various criteria, parameters, or factors, can be used for the ranking. In embodiments, the ranking can be based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light present surrounding the display, a weather condition in an area around the display, an amount of white data, an amount of grayscale data, an amount of black and white data, or a time of day. In embodiments, the ranking can be based on conversion rates. Conversion rates can include individuals seeing information about a restaurant and then going to the restaurant for a meal, seeing advertisements for raingear then purchasing an umbrella, and so on.

Figure 7:
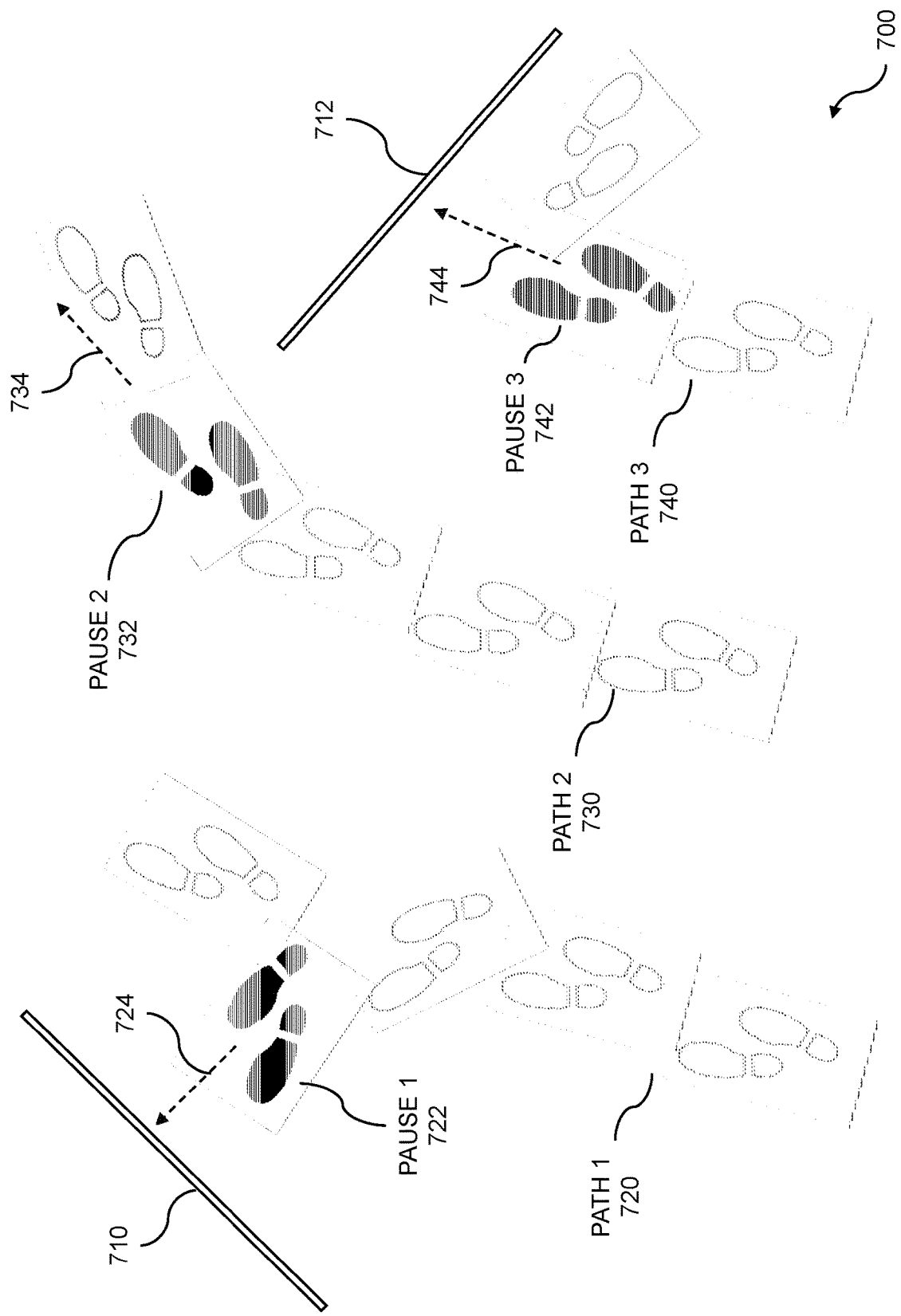
FIG. 7 shows a representation of a foot traffic pattern.

FIG. 7 shows a representation 700 of a foot traffic pattern. Networked data management is based on traffic patterns such as pedestrian traffic patterns. Data is collected from a plurality of mobile devices by one or more immobile devices. The immobile devices can include network devices such as wireless access points. A traffic pattern is determined for a subset of the plurality of mobile devices. The foot traffic pattern can include pedestrian traffic, low-speed traffic, and so on. Content is pushed to a display associated with the one or more immobile devices. The display can be an immobile display, a projection, a 3-D projection, and so on. One or more people can travel through a public space such as a park, a square, a market, a playground, a green space, or a mall. The people can travel on foot, on bicycles, on scooters, in wheelchairs, etc. Three example paths through a public area shown. The paths shown include path 1 720, path 2 730, and path 3 740. While three paths are shown, in practice, other numbers of paths can be present. Multiple pedestrians and other low-speed travelers can use the same paths 720, 730, and 740, or can use separate paths, other paths, etc.

A pedestrian or other low-speed traveler can travel along path 1 720 and pause at pause 1 722. The pedestrian can have a line of sight view 724 to a display 710. With the pedestrian paused, and gazing in the direction of display 710, content can be pushed to display 710. A pedestrian or other low-speed traveler can travel along path 2 730 and pause at pause 2 732. Although the pedestrian is paused, and has a direction of gaze 734, the pedestrian does not have a line of sight view to screen 710, nor a line of sight view to screen 712. No content may be pushed to either display 710 or display 712 on behalf of the pedestrian or other low-speed traveler traveling along path 2 and paused at pause 2. A pedestrian or other low-speed traveler can travel along path 3 740 and pause at pause 3 742. The pedestrian has a direction of gaze 744 to display 712. Content can be pushed to display 712. The content that is pushed to display 710 and to display 712 can be the same content, different content, no content, and so on.

The content can be pushed to display 710 or to display 712 in response to various types of requests. In embodiments, the pushing content can be in response to requesting content by one of the one or more immobile devices. The immobile devices can be used to track pedestrians and other low-speed travelers through the public space. In other embodiments, the pushing content can be in response to requesting content by the display. The display 710 or the display 712 can request that content be refreshed, changed, adjusted, etc. The adjustment of the content can include brightness, color, etc. In further embodiments, the pushing content can be in response to requesting content by the network hub. The network hub can be a hub, a switch, a router, a wireless router, etc. The content that is pushed to display 710 or display 712 can be ranked. Further embodiments include ranking a plurality of content messages and selecting one message from the plurality of content messages to push to the display. The ranking can be based on a communication plan, an advertising campaign, a tourism campaign, a public service announcement, etc. In embodiments, the ranking can be based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light surrounding the display, a weather condition in an area around the display, an amount of white data, an amount of grayscale data, an amount of black and white data, or a time of day.

Figure 8:
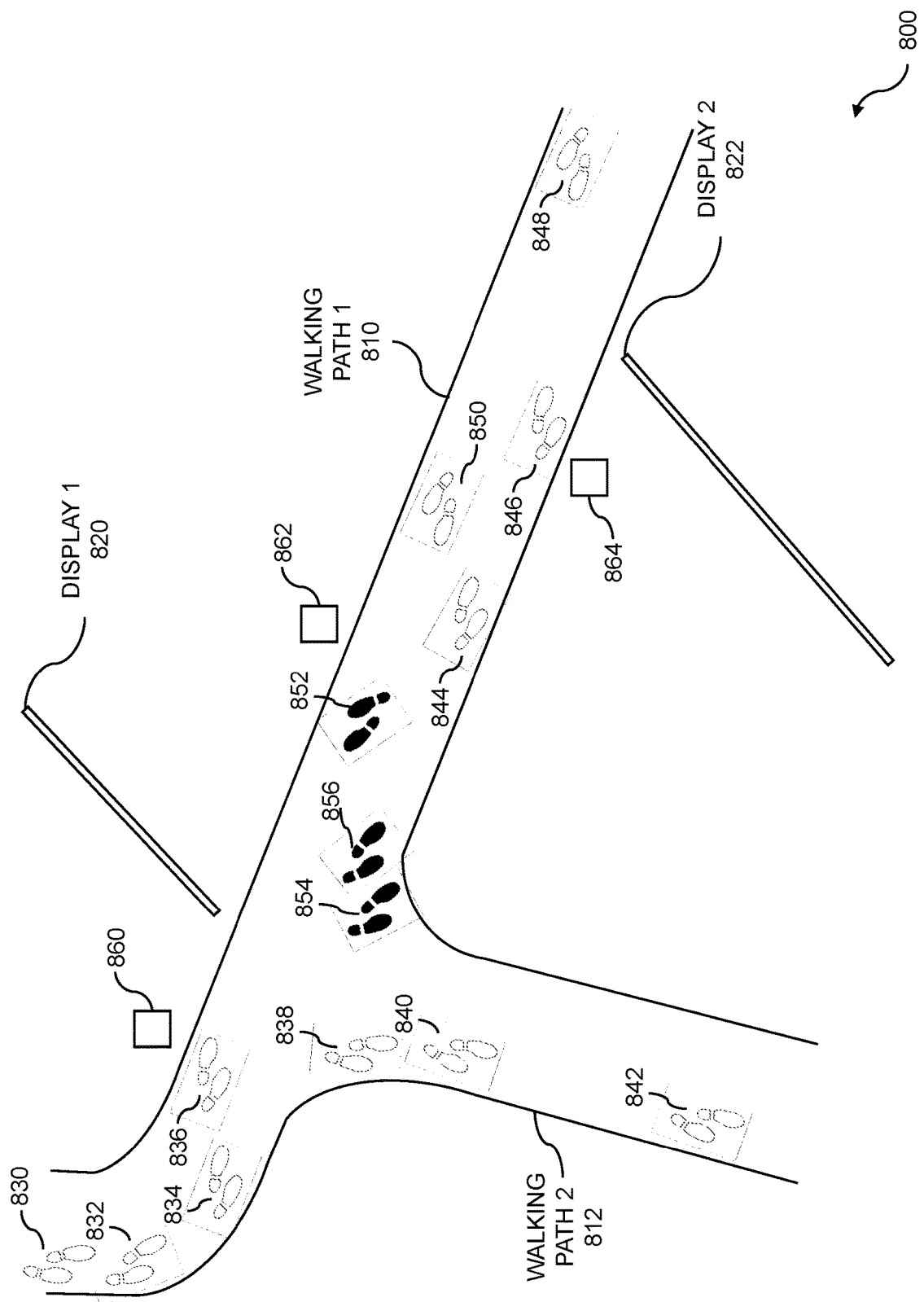
FIG. 8 illustrates traffic clustering.

FIG. 8 illustrates traffic clustering. Traffic, such as pedestrian traffic, can cluster in spaces, including public spaces, such as squares, commons, malls, parks, and so on. Networked data management uses pedestrian traffic patterns for pushing content. The content can include public service announcements (PSA), welcome messages, directions, sports scores, cultural information, and so on. Data is collected from a plurality of mobile devices by one or more immobile devices. A traffic pattern is determined for a subset of the plurality of mobile devices. Content is pushed to a display associated with the one or more immobile devices.

Traffic clustering is shown 800. Traffic, including pedestrian traffic, can include people traveling through a public space such as a park, a playground, a square, a market, a green space, a mall, a common, a plaza, and so on. Pedestrian traffic can include a variety of low-speed traffic such as bicycles, e-bicycles, chairs, Segways™, scooters, Razors™, and so on. Pedestrians, such as pedestrians 830, 832, 834, 836, 838, 840, 842, 844, 846, 848, 850, 852, 854, and 856, can travel along pathway 1 810 and pathway 2 812, can move about freely within the space, and so on. In embodiments, the foot traffic pattern is determined using two or more of the immobile devices such as immobile devices 860, 862, and 864. In other embodiments, the determining the traffic pattern such as a foot traffic pattern is based on triangulation information using the two or more of the immobile devices. The triangulation can be based on Wi-Fi™ signals received by one or more wireless access points.

The pedestrians and others can be located in high densities, low densities, singly, and so on. The presence of pedestrians and others can be determined by immobile devices 860, 862, and 864. While three immobile devices are shown, one or more immobile devices can be included. The immobile devices can collect data from mobile devices that are used by the pedestrians. The data can be collected anonymously from the mobile devices, where the data may not be directly attributable to a particular individual. The data can include network data such as a media access control (MAC) address, a service set identifier (SSID), a previous SSID, pings from a mobile device, power levels, a time, and so on. In embodiments, the determining the traffic pattern can include evaluation of a cumulative moving average. The cumulative moving average can be based on multiple devices, multiple individuals, and so on. The cumulative moving average can be for a specific time interval such as a few minutes, an hour, a day, a day of a week, and so on.

The traffic pattern, which can include the foot traffic pattern, can also include information on movement of the two or more mobile devices from the plurality of mobile devices. The direction of travel of pedestrians can be determined using immobile devices 860, 862, and 864. For example, pedestrians 830, 832, 834, and 836 can be traveling in one direction, while pedestrians 848, 850, and 852 can be traveling in another direction. In embodiments, the foot traffic pattern can include augmenting data collected from the plurality of mobile devices with global positioning system (GPS) information. The GPS information can be collected anonymously. One or more pedestrians can be detected by one or more immobile devices. The immobile devices, which can include wireless access points, can determine whether one or more pedestrians are approaching a display. Display 1 820 and display 2 822 are shown. One or more displays can be present. The displays can include immobile displays, projections, 3-D projections, and so on. The immobile devices can evaluate direction of gaze by an individual associated with the mobile device. For example, pedestrians 854 and 856 can be evaluated to be gazing in the direction of display 2 822, pedestrian 852 can be evaluated to be gazing in the direction of display 1 820, and so on.

Content can be pushed to a display associated with the one or more immobile devices. Based on the gaze direction of pedestrians 854 and 856, and their proximity to immobile devices 862 and 864, content can be pushed to display 2 822. In embodiments, the content can include a series of messages. The message can be related to the public space, can include advertisements and public service announcements, and so on. The series of messages can include repeated content. The content can be repeated every few minutes, some number of times per hour or day, etc. The series of messages can provide a narrative. The narrative can relate to the public space, to a retail store, to an advertising campaign, to the city in which the public space is located, and so on. In embodiments, content can be pushed to a second display associated with the one or more immobile devices. Such content can include news, advertisements, public service announcements, sporting event scores, cultural information, etc. In some cases, there can be a series of displays which can communicate a series of messages. The content pushed to the display can be ranked. Embodiments can include ranking a plurality of content messages and selecting one message from the plurality of content messages to push to the display. The ranking can be based on a variety of conditions and parameters. The ranking can be based on the narrative. In embodiments, the ranking can be based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light present the display, a weather condition in an area around the display, an amount of white data, an amount of grayscale data, an amount of black and white data, or a time of day.

In embodiments, the data collected from the plurality of mobile devices can include profile information for users associated with a second subset of the plurality of mobile devices. The profile information can be based on a MAC address, an SSID, a previous SSID, and so on, and can include time information, time of day information, day information, location, information, and so on. The profile can be based on a high interest objective function. Calculations of the high interest objective function can take place over a time interval such as a 2-minute time interval. The objective function can contain terms where:

CMA(x)=Cumulative moving average of x for given interval specific to week, e.g. 9:00-9:02 on Mondays.

NbD=Nearby Devices, number of devices nearby content display.

NwD=New Devices, number of nearby devices not seen within the past week (seen within the current day is fine).

DwD=Dwelling Devices, number of nearby devices that have been nearby for >5 consecutive minutes.

HF=Holiday Factor, unique value between 0 and 10 for all public holidays, specific to location, where 0 indicates expected significant drop in pedestrian traffic and 10 indicates expected significant increase in pedestrian traffic; 1 for standard day.

The high interest objective function can be described by the equation:

$$\text{High Interest Objective Function} = HF*(NbD/CMA(NbD)+NwD/CMA(NwD)+DwD/CMA(DwD))$$

The high interest objective function could also allow for expected change in nearby devices based on past data. There are various techniques that can be included such as using weighted factors instead of (or in addition to) the CMA factor, differing time intervals, and so on. An example of the type of information that can be collected can include: MAC addresses at a location at a time, such as MAC address collected at the gym, Monday morning, at 6:30 a.m.; SSIDs associated with MAC addresses such as a MAC address at a home network and at a public network; power level of nearby devices based on a broadcast; weather conditions such as sunlight, ambient temperature, or precipitation; and other third-party information. In some cases, information on the most recent location or network to which the mobile device was connected can be collected. An example of context evaluation can include: weather information; the number of devices at a particular location; the number of devices moving toward and away from a given location; and demographic information or behavior profiles of devices that are nearby that can be accumulated and correlated with third party data. An example of the type of content that can be delivered can include: transit information; public announcements; local advertising; and sponsored content such as birthday greetings sent by a local bank.

Figure 9:
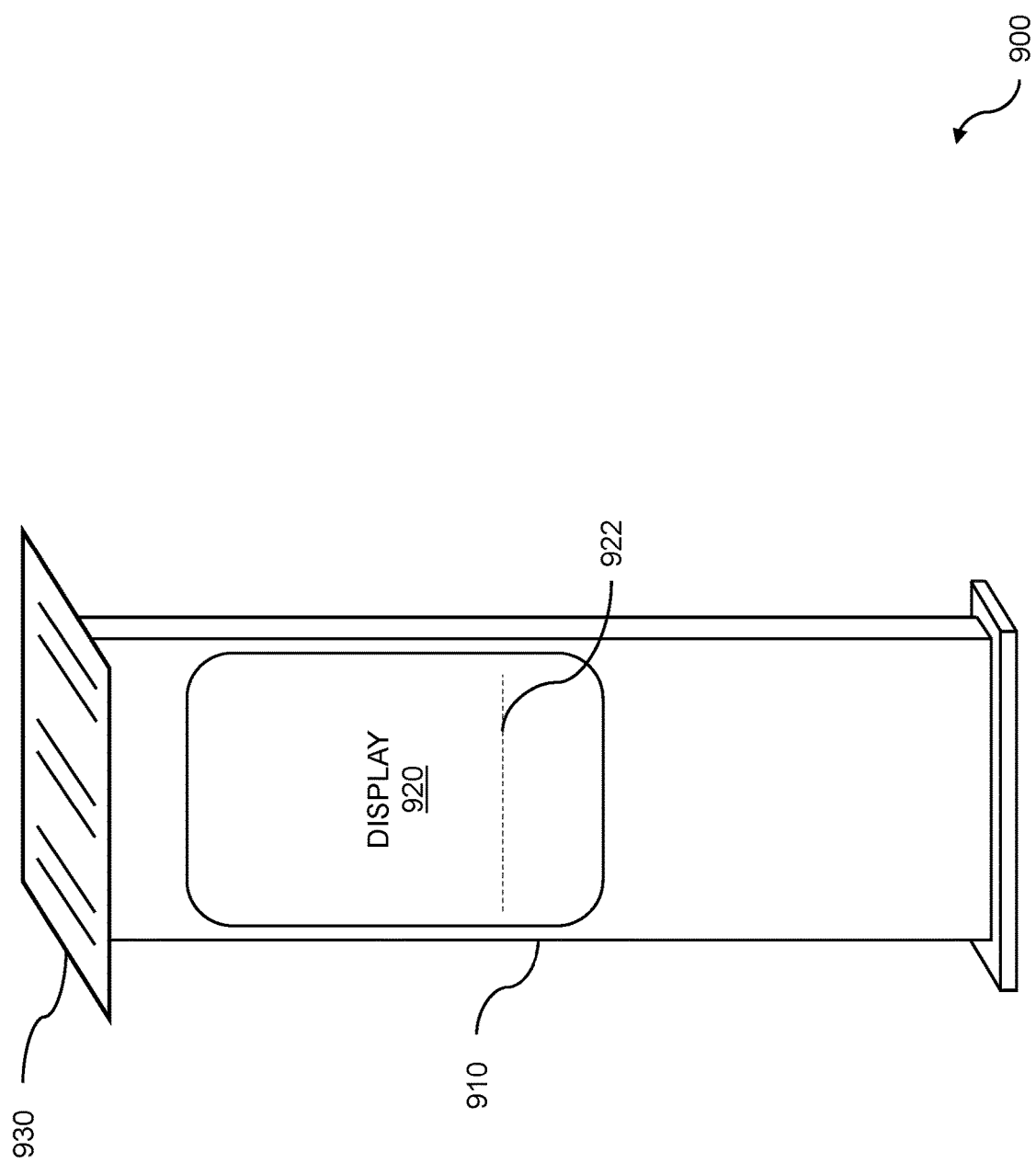
FIG. 9 shows an example display.

FIG. 9 shows an example display. A display 900 can be used for networked data management for pedestrian and other types of traffic patterns. A diagrammatic representation of an example display 900 is shown. The display can include a free-standing housing 910. While a free-standing housing is shown, the housing could be mounted on a wall, suspended from an overhead support, incorporated into a floor, and so on. The free-standing housing can be coupled to a display 920. The display 920 can include a light emitting diode (LED) display, a liquid crystal display (LCD), an organic LED (OLED) display, a plasma display, etc. The display can include a projection, where the projection can include a 2-D projection, a 3-D projection, a holographic projection, and the like. The display can be used to render content messages such as ranked content messages. In embodiments, the ranking of the messages can be based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light surrounding the display, a weather condition in an area around the display, an amount of white data, an amount of grayscale data, an amount of black and white data, or a time of day. Other messages can be displayed, such as PSAs, advertisements, sports scores, tourist information, emergency information, welcome messages, and the like. The content displayed can be based on "buzzing". Buzzing can include providing a link to a display so that a user can display a special message. The special message might include a directed notification such as a proposal of marriage. Content shown on the display can be real time dynamic content with pertinent information such as train arrival times, related advertising, etc. The display 920 can be partitioned 922 into an upper portion and a lower portion. The upper portion can include a percentage such as 75%, and the lower portion can include a complementary portion such as 25%. The upper portion of the display and the lower portion of the display can include different content. The free-standing housing can be coupled to a solar panel 930. While a solar panel is shown coupled to the top of the free-standing housing, the solar panel can be incorporated in the front, back, or sides of the housing or can be located separately from the housing. The solar panel can be used to charge batteries coupled to the housing. The batteries can be used to power the display 920, to provide power to other electrical equipment such as a computer, a network switch, and so on.

Figure 10:
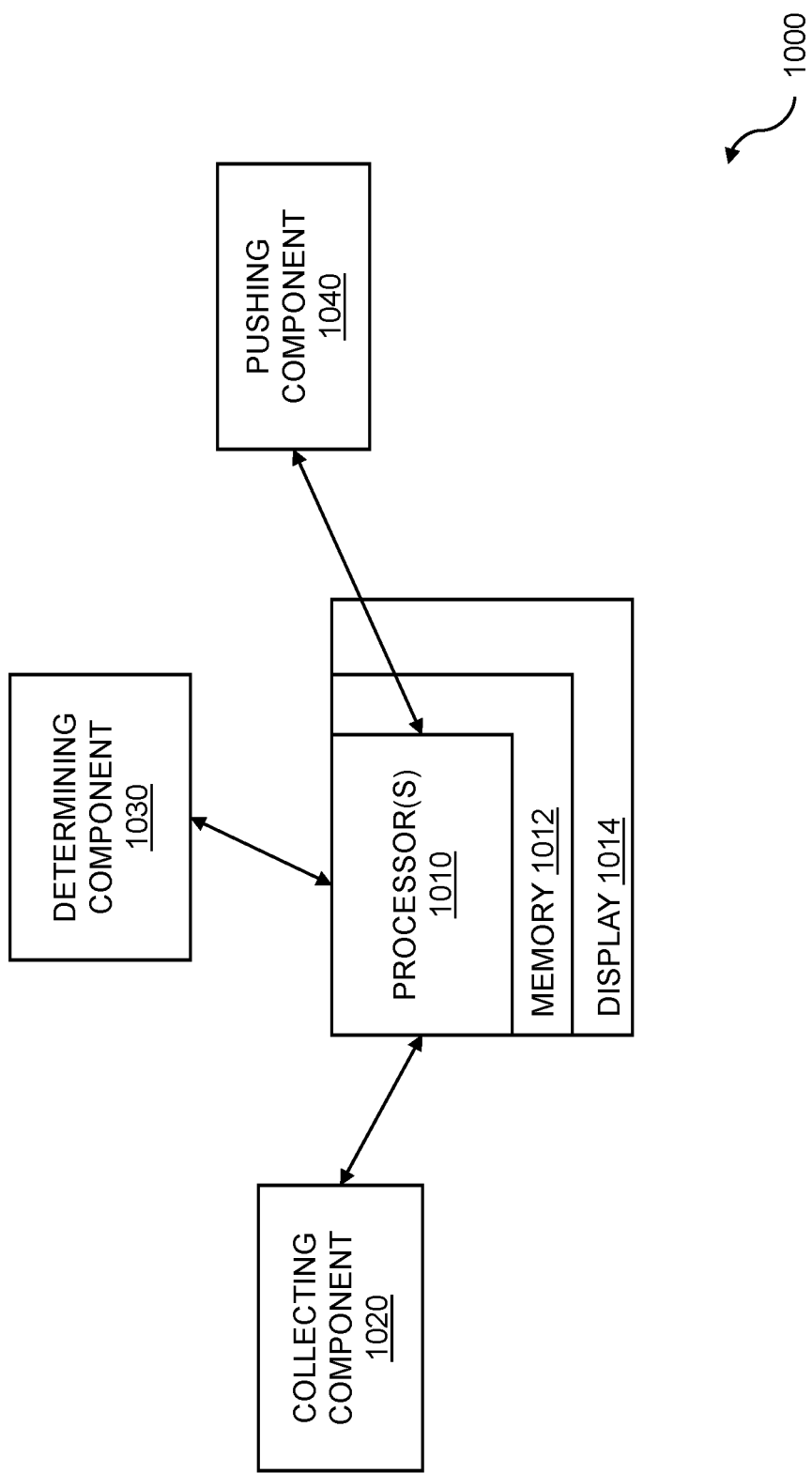
FIG. 10 is a system diagram for data management.

FIG. 10 is a system diagram for data management. Data management can include networked data management, where the networked data management uses pedestrian traffic patterns. Data can be collected by one or more immobile devices from a plurality of mobile devices. The mobile devices can include smartphones, personal digital assistants (PDAs), tablet devices, smart watches, smart glasses, wearable computers, etc. Each device of the plurality of mobile devices can be associated with an individual, where the individual can be a pedestrian, a bicyclist, a person riding a scooter or Segway™, a person in a wheelchair, and so on. A traffic pattern can be determined for a subset of the plurality of mobile devices. The traffic pattern can include a foot traffic pattern. The traffic pattern can include a soft mobility traffic pattern, where the traffic movement is based on non-motorized or human powered transport. The subset of the plurality of mobile devices can be within an outdoor environment. The outdoor environment can include a public space such as a park, a plaza, a square, a mall, and so on. The outdoor environment can include shared public spaces, green spaces, and the like. Content can be pushed to a display that can be associated with the one or more immobile devices. The display can be an immobile display, a projection, a 3-D projection, and so on. The display can be a solar powered display.

The system 1000 can include one or more processors 1010 coupled to a memory 1012, which can store and retrieve instructions and data, and a display 1014. The system 1000 further includes a collecting component 1020. The coupling component can be a software component, a software block, and so on. The collecting component 1020 can gather information from a subset of a plurality of mobile devices. The collected information can include a media access control (MAC) address, a service set identifier (SSID), a previous SSID, a power level, environmental information, and so on. The environmental information can include weather, event, or lighting conditions. The collected information can be based on dwell time for a mobile device within the subset of the plurality of mobile devices. The system 1000 further includes a determining component 1030. The determining component can be a software component or a software block. The determining component can determine a traffic pattern for a subset of the plurality of mobile devices. The traffic pattern can include a foot traffic pattern. The foot traffic pattern can factor in weather or climactic conditions, a number of mobile devices at a given location, a number of devices moving towards a location, a number of devices moving away from a location, and so on. The traffic pattern can include a soft mobility traffic pattern, as discussed above, where the soft mobility traffic can include pedestrian traffic, cyclists, non-motorized transportation, etc. The traffic pattern can include information on dwell time for a mobile device within the subset of the plurality of mobile devices. The dwell time can include the amount of time that a mobile device is detected within an outdoor environment, the amount of time a user of the mobile device is gazing in the direction of a display, and so on.

The system 1000 further includes a pushing component 1040. The pushing component can be a software component or a software block. In embodiments, the pushing component pushes content to a display associated with the one or more immobile devices. The display can be an immobile display, a projection, and so on. The pushing of content to a display can occur in response to various events, conditions, parameters, etc. In embodiments, the pushing content is in response to requesting content by one of the one or more immobile devices. The one or more immobile devices can request content based on the number of mobile devices detected, a specific mobile device detected, etc. In other embodiments, the pushing content can be in response to requesting content by the display. The display can request that content be refreshed, modified, made brighter or darker, be in color or black and white, etc. In further embodiments, the pushing content can be in response to requesting content by the network hub. The network hub can be a hub, a switch, a router, and so on. In other embodiments, the content which is pushed to the display can be routed through a network hub. The content can be obtained from a vendor or a content provider, downloaded from a content library, and the like. Further embodiments can include ranking a plurality of content messages and selecting one message from the plurality of content messages as the content for the pushing to the display. The ranking can be based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light surrounding the display, a weather condition in an area around the display, an amount of white data, an amount of grayscale data, an amount of black and white data, or a time of day.

Embodiments provide a computer program product embodied in a non-transitory computer readable medium for data management, the computer program product comprising code which causes one or more processors to perform operations of: collecting data from a plurality of mobile devices by one or more immobile devices; determining a traffic pattern for a subset of the plurality of mobile devices; and pushing content to a display associated with the one or more immobile devices.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for data management comprising:
    collecting data from a plurality of mobile devices by one or more immobile devices;
    determining a traffic pattern for a subset of the plurality of mobile devices;
    evaluating a direction of travel for an individual carrying one of the subsets of the plurality of mobile devices; and
    pushing content to a display coupled to the one or more immobile devices based on the evaluating of the direction of travel and the calculation of a high interest objective function.

2. The method of claim 1 wherein the traffic pattern comprises a foot traffic pattern.

3. The method of claim 1 wherein the traffic pattern comprises a soft mobility traffic pattern.

4. The method of claim 1 wherein the traffic pattern includes information on dwell time for a mobile device within the subset of the plurality of mobile devices.

5. The method of claim 1 further comprising evaluating return of a mobile device within the subset of the plurality of mobile devices to an area within view of the display.

6. The method of claim 5 wherein the return of the mobile device within the subset of the plurality of mobile devices is within a specific time interval.

7. The method of claim 1 wherein calculation of the high interest objective function further comprises evaluating a holiday factor, wherein the holiday factor is a numerical value associated with a public holiday indicative of expected pedestrian traffic.

8. The method of claim 1 wherein calculation of the high interest objective function further comprises determining a number of nearby mobile devices.

9. The method of claim 8 wherein calculation of the high interest objective function further comprises determining a number of previously undetected mobile devices from the determined number of nearby mobile devices.

10. The method of claim 1 wherein the traffic pattern is determined using two or more of the immobile devices.

11. The method of claim 10 wherein the determining the traffic pattern is based on triangulation information using the two or more of the immobile devices.

12. The method of claim 1 wherein the traffic pattern includes information on movement of two or more mobile devices from the plurality of mobile devices.

13. The method of claim 1 wherein the determining the traffic pattern includes augmenting data collected from the plurality of mobile devices with location positioning information.

14. The method of claim 1 wherein the determining the traffic pattern includes evaluation of a cumulative moving average.

15. The method of claim 1 further comprising ranking a plurality of content messages and selecting one message from the plurality of content messages as the content for the pushing to the display.

16. The method of claim 15 wherein the ranking is based on a number of mobile devices present, a direction of motion for a majority of the mobile devices, a temperature in an area surrounding the display, a battery level charge for powering the display, a battery voltage, a solar cell current, a currency amount associated with the one message, a screen temperature for the display, an amount of ambient light present surrounding the display, a weather condition in an area around the display, an amount of white data, an amount of grayscale data, an amount of black and white data, or a time of day.

17. The method of claim 1 wherein the content includes a series of messages.

18. The method of claim 1 further comprising pushing content to a second display associated with the one or more immobile devices.

19. The method of claim 1 further comprising performing interest level management using the traffic pattern.

20. The method of claim 1 further comprising performing cluster analysis using the traffic pattern.

21. The method of claim 1 further comprising sensing pausing by a mobile device within the subset of the plurality of mobile devices.

22. The method of claim 21 further comprising evaluating direction of gaze by an individual associated with the mobile device.

23. The method of claim 1 further comprising defining the content that is pushed using environmental information.

24. The method of claim 1 wherein the data collected from the plurality of mobile devices includes profile information for users associated with a second subset of the plurality of mobile devices.

25. The method of claim 1 further comprising setting the display into a low power mode based on the traffic pattern.

26. The method of claim 11 wherein the one or more immobile devices are coupled to one or more sensors.

27. The method of claim 26 wherein the one or more sensors coupled to the one or more immobile devices detect wireless signals from a mobile device.

28. The method of claim 27 wherein the wireless signals include Wi-Fi, Bluetooth™, or near field communication (NFC) signals.

29. The method of claim 27 wherein the wireless signals include data comprising one or more of channel number, encryption protocol, and signal strength.

30. The method of claim 27 wherein the wireless signals include data comprising service set identification (SSID) data.

31. The method of claim 30 wherein the SSID data is used to identify a mobile device using a unique identifier based on media access control (MAC) address of the mobile device.

32. The method of claim 31 wherein the SSID data includes previous SSID information from the mobile device.

33. The method of claim 31 wherein the SSID data is collected anonymously, such that the SSID data is unattributable to the individual.

34. A computer program product embodied in a non-transitory computer readable medium for data management, the computer program product comprising code which causes one or more processors to perform operations of:
   collecting data from a plurality of mobile devices by one or more immobile devices;
   determining a traffic pattern for a subset of the plurality of mobile devices; and
   pushing content to a display coupled to the one or more immobile devices based on the traffic pattern and the calculation of a high interest objective function.

35. A computer system for data management comprising:
   a memory which stores instructions;
   one or more processors attached to the memory wherein the one or more processors, when executing the instructions which are stored, are configured to:
      collect data from a plurality of mobile devices by one or more immobile devices;
      determine a traffic pattern for a subset of the plurality of mobile devices;
      evaluate a direction of travel for an individual carrying one of the subsets of the plurality of mobile devices; and
      push content to a display coupled to the one or more immobile devices based on the evaluation of the direction of travel and the calculation of a high interest objective function.

\* \* \* \* \*